United States Patent
Chan et al.

(10) Patent No.: US 9,727,995 B2
(45) Date of Patent: *Aug. 8, 2017

(54) ALTERNATIVE REPRESENTATIONS OF VIRTUAL CONTENT IN A VIRTUAL UNIVERSE

(71) Applicant: International Business Machines Corporation, Armonk, NY (US)

(72) Inventors: Philip S. P. Chan, Marrickville (AU); Kenneth S. Sabir, Marrickville (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/255,234

(22) Filed: Sep. 2, 2016

(65) Prior Publication Data

US 2016/0371870 A1    Dec. 22, 2016

Related U.S. Application Data

(63) Continuation of application No. 12/339,423, filed on Dec. 19, 2008, now Pat. No. 9,472,014.

(51) Int. Cl.
*G06T 15/00* (2011.01)
*G06T 11/60* (2006.01)
(Continued)

(52) U.S. Cl.
CPC .............. *G06T 11/60* (2013.01); *G06Q 30/02* (2013.01); *G06T 3/00* (2013.01); *G06T 11/001* (2013.01);
(Continued)

(58) Field of Classification Search
CPC .. G06F 17/30905; G06F 17/21; G06F 17/248; G06F 17/30; G06F 17/30038;
(Continued)

(56) References Cited

U.S. PATENT DOCUMENTS 5,802,296 A    9/1998    Morse et al.
5,956,028 A    9/1999    Matsui et al.
(Continued)

FOREIGN PATENT DOCUMENTS

WO    2007/107259 A1    9/2007

OTHER PUBLICATIONS

M R Everingham et al., "Head-mounted mobility aid for low vision using scene classification techniques", The International Journal of Virtual Reality, 1999, The International Journal of Virtual Reality, 11 pages.
(Continued)

*Primary Examiner* — Sultana M Zalalee
(74) *Attorney, Agent, or Firm* — William H. Hartwell; Hunter E. Webb; Keohane & D'Alessandro PLLC (57) ABSTRACT

An invention for generating an alternative representation of virtual content in a virtual universe is provided. In one embodiment, there is an alternative representation tool, including a visual component configured to determine a visual capacity of a user of a virtual universe. The alternative representation tool further includes an alternative component configured to provide an alternative representation of a virtual content renderable in the virtual universe based on the visual capacity of the user of the virtual universe.

18 Claims, 9 Drawing Sheets

(51) Int. Cl.
*G06Q 30/02* (2012.01)
*G06T 3/00* (2006.01)
*G06T 11/00* (2006.01)
*H04L 29/06* (2006.01)
*G06F 17/24* (2006.01)
*H04L 29/08* (2006.01)

(52) U.S. Cl.
CPC .............. *G06T 15/00* (2013.01); *H04L 67/38* (2013.01); *G06F 17/241* (2013.01); *G06T 2200/16* (2013.01); *G06T 2207/20004* (2013.01); *H04L 67/10* (2013.01)

(58) Field of Classification Search
CPC ................ G06F 17/30867; G06F 8/38; H04N 21/23412; H04N 21/44012; H04N 21/25891; H04N 21/47205; G06T 19/006; G06T 19/20; G06T 15/00; G06T 2210/61; G06T 2219/2012; G09B 21/001; G09G 2320/02; G09G 2320/0606; G09G 2320/0626; G09G 2320/066; G09G 2340/14; G09G 5/00
See application file for complete search history.

(56) References Cited

U.S. PATENT DOCUMENTS

| | | | |
|---|---|---|---|
| 5,983,003 A | 11/1999 | Lection et al. | |
| 6,081,270 A | 6/2000 | Berry et al. | |
| 6,118,456 A | 9/2000 | Cooper | |
| 6,329,986 B1 | 12/2001 | Cheng | |
| 6,348,927 B1 | 2/2002 | Lipkin | |
| 6,961,458 B2 | 11/2005 | Dutta et al. | |
| 7,620,903 B1 | 11/2009 | Rasmussen et al. | |
| 9,472,014 B2 * | 10/2016 | Chan et al. | ............. G06T 15/00 |
| 2004/0120483 A1 | 6/2004 | Buzbee | |
| 2004/0212546 A1 | 10/2004 | Dixon et al. | |
| 2006/0290712 A1 | 12/2006 | Hong et al. | |
| 2008/0170118 A1 | 7/2008 | Albertson et al. | |
| 2009/0192785 A1 | 7/2009 | Cavender et al. | |
| 2009/0327883 A1 | 12/2009 | Robertson et al. | |
| 2010/0156892 A1 | 6/2010 | Chan et al. | |

OTHER PUBLICATIONS

Barreto Alonso, "Digital Image processing for pre-compensation of high-order aberrations of the human eye", Copyright 2000-2008 Unbound Medicine, Inc., 1 page.
Sultana Marcia Zalalee, USPTO Office Action, U.S. Appl. No. 12/339,423, Mail Date Aug. 5, 2011, 28 pages.
Sultana Marcia Zalalee, USPTO Final Office Action, U.S. Appl. No. 12/339,423, Mail Date Nov. 9, 2011, 16 pages.
Sultana Marcia Zalalee, USPTO Office Action, U.S. Appl. No. 12/339,423, Mail Date Mar. 1, 2012, 17 pages.
Sultana Marcia Zalalee, USPTO Final Office Action, U.S. Appl. No. 12/339,423, Mail Date Jun. 25, 2012, 18 pages.
Sultana Marcia Zalalee, USPTO Office Action, U.S. Appl. No. 12/339,423, Notification Date May 20, 2013, 28 pages.
Sultana Marcia Zalalee, USPTO Final Office Action, U.S. Appl. No. 12/339,423, Notification Date Sep. 13, 2013, 25 pages.
Sultana Marcia Zalalee, USPTO Notice of Allowance, U.S. Appl. No. 12/339,423, Date Mailed Jun. 22, 2016, 10 pages.

* cited by examiner

ALTERNATIVE REPRESENTATIONS OF VIRTUAL CONTENT IN A VIRTUAL UNIVERSE

CROSS-REFERENCE TO RELATED APPLICATIONS

The present patent document is a continuation of U.S. patent application Ser. No. 12/339,423, filed Dec. 19, 2008, entitled "ALTERNATIVE REPRESENTATIONS OF VIRTUAL CONTENT IN A VIRTUAL UNIVERSE", the disclosure of which is incorporated herein by reference.

FIELD OF THE INVENTION

This invention relates generally to virtual universes and more specifically to alternative representations of virtual content in a virtual universe.

BACKGROUND OF THE INVENTION

Virtual universes (VUs) or virtual worlds are computer-based simulated environments intended for its users or residents to inhabit and interact via avatars, which are personas or representations of the users of the virtual universes. These types of virtual universes are now most common in multiplayer online games, such as Second Life®, which is a trademark of Linden Research Inc. in the United States. Avatars in these types of virtual universes, which can number well over a million, have a wide range of business and social experiences.

It is possible for these VUs to be quite complex, with each VU or region within the VU having a large number of avatars, objects, texts and scripts for desired visual and functional effects. However, visually complex VUs can make it difficult for vision impaired users, as well as non-vision impaired users, to identify and distinguish objects in the virtual universe.

SUMMARY OF THE INVENTION

In one embodiment, there is a method for providing an alternative representation of virtual content in a virtual universe comprising: determining a visual capacity of a user of a virtual universe; and providing an alternative representation of a virtual content renderable in the virtual universe based on the visual capacity of the user of the virtual universe.

In a second embodiment, there is a computer system for providing an alternative representation of virtual content in a virtual universe. In this embodiment, the computer system comprises at least one processing unit and memory operably associated with the at least one processing unit. An alternative representation tool is storable in memory and executable by the at least one processing unit. The alternative representation tool comprises: a visual component configured to determine a visual capacity of a user of a virtual universe; and an alternative component configured to provide an alternative representation of a virtual content renderable in the virtual universe based on the visual capacity of the user of the virtual universe.

In a third embodiment, there is a computer-readable medium storing computer instructions, which when executed, enables a computer system to provide an alternative representation of virtual content in a virtual universe. In this embodiment, the computer instructions comprise: determining a visual capacity of a user of a virtual universe; and providing an alternative representation of a virtual content renderable in the virtual universe based on the visual capacity of the user of the virtual universe.

In a fourth embodiment, there is a method for deploying an alternative representation tool for use in a computer system that provides an alternative representation of virtual content in a virtual universe. In this embodiment, a computer infrastructure is provided and is operable to: determine a visual capacity of a user of a virtual universe; and provide an alternative representation of a virtual content renderable in the virtual universe based on the visual capacity of the user of the virtual universe.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to alternative representations of virtual content in a virtual universe, such that virtual universes are easier to view and navigate for both the visually impaired and the non-visually impaired. In these embodiments, an alternative representation tool provides the capability to provide an alternative representation of virtual content in a virtual universe. The alternative representation tool comprises a visual component configured to determine a visual capacity of a user of a virtual universe. An alternative component is configured to provide an alternative representation of a virtual content renderable in the virtual universe based on the visual capacity of the user of the virtual universe.

Figure 1:
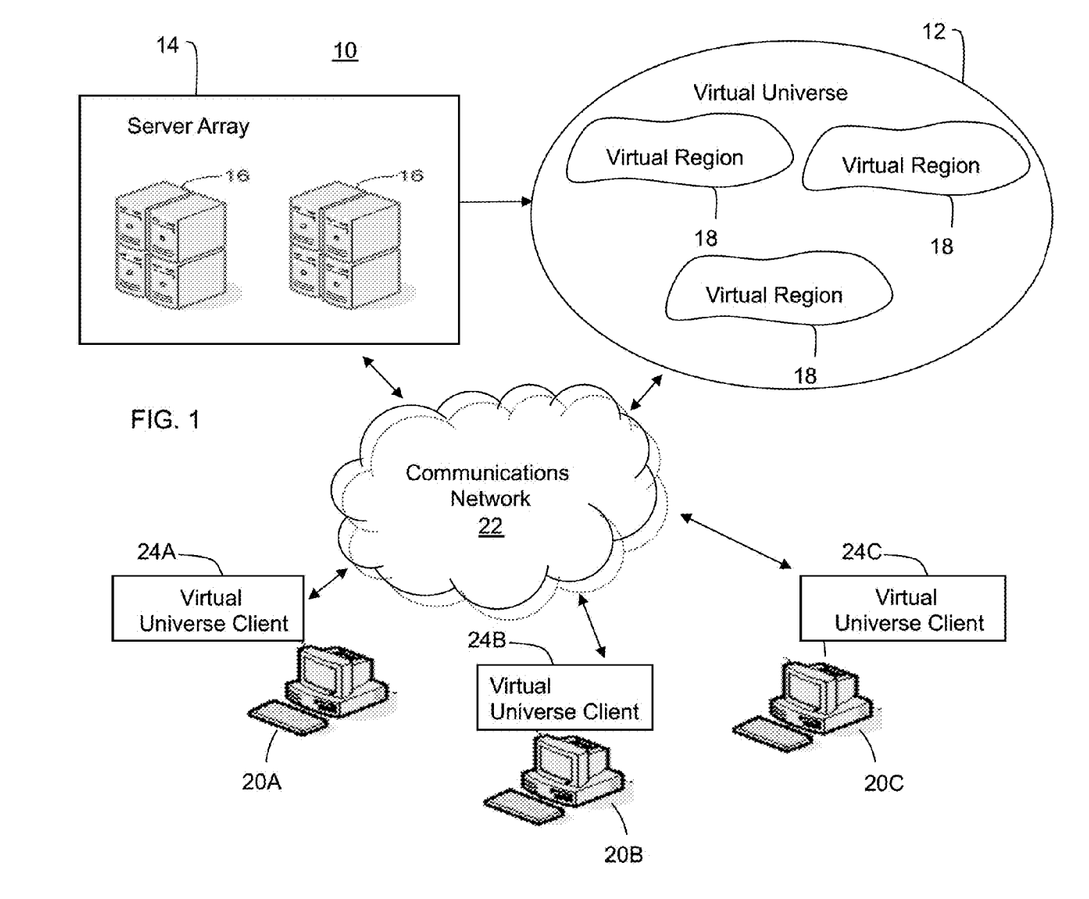
FIG. 1 shows a high-level schematic diagram showing a networking environment for providing a virtual universe according to one embodiment of this invention.

FIG. 1 shows a high-level schematic diagram showing a networking environment 10 for providing a virtual universe (VU) 12 according to one embodiment of this invention in which a service for providing an alternative representation of virtual content in a virtual universe can be utilized. As shown in FIG. 1, networking environment 10 comprises a server array or grid 14 comprising a plurality of servers 16 each responsible for managing a portion of virtual real estate within VU 12. A virtual universe provided by a multiplayer online game, for example, can employ thousands of servers to manage all of the virtual real estate. The virtual content of VU 12 is comprised of a number of objects, each having associated texts/scripts, defined in a programming language readable by VU 12. The virtual content is managed by each of servers 16 within server array 14 and may show up in VU 12 as a virtual region 18. Like the real-world, each virtual region 18 within VU 12 comprises a landscape having virtual content, such as buildings, stores, clubs, sporting arenas, parks, beaches, cities and towns all created by administrators or residents of the virtual universe that are represented by avatars. These examples of virtual content are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe, or even only one region in a small virtual universe. FIG. 1 also shows that users operating computers 20A-20C (hereinafter referred generally as 20) interact with VU 12 through a communications network 22 via virtual universe clients 24A-24C (hereinafter referred generally as 24) that reside in computers 20, respectively. Below are further details of VU 12, server array 14, and virtual universe client 24.

One of the ways that users or administrators can interact with the virtual universe is to create virtual content for the virtual universe. An illustrative but non-limiting listing of virtual content that can be created includes items such as apparel for avatars, animations for a multitude of purposes (e.g., advertisements, instructional material, etc.), avatar accessories (e.g., jewelry, hairpieces, clothing, etc.), scripts for performing certain functions in the virtual universes, building components, avatar appearance features, recreational equipment (e.g., bicycles), automobiles, etc. As will be further described herein, embodiments of this invention are directed to providing an alternative representation of these types of virtual content renderable in the virtual universe based on the visual capacity of users of VU 12.

Figure 2:
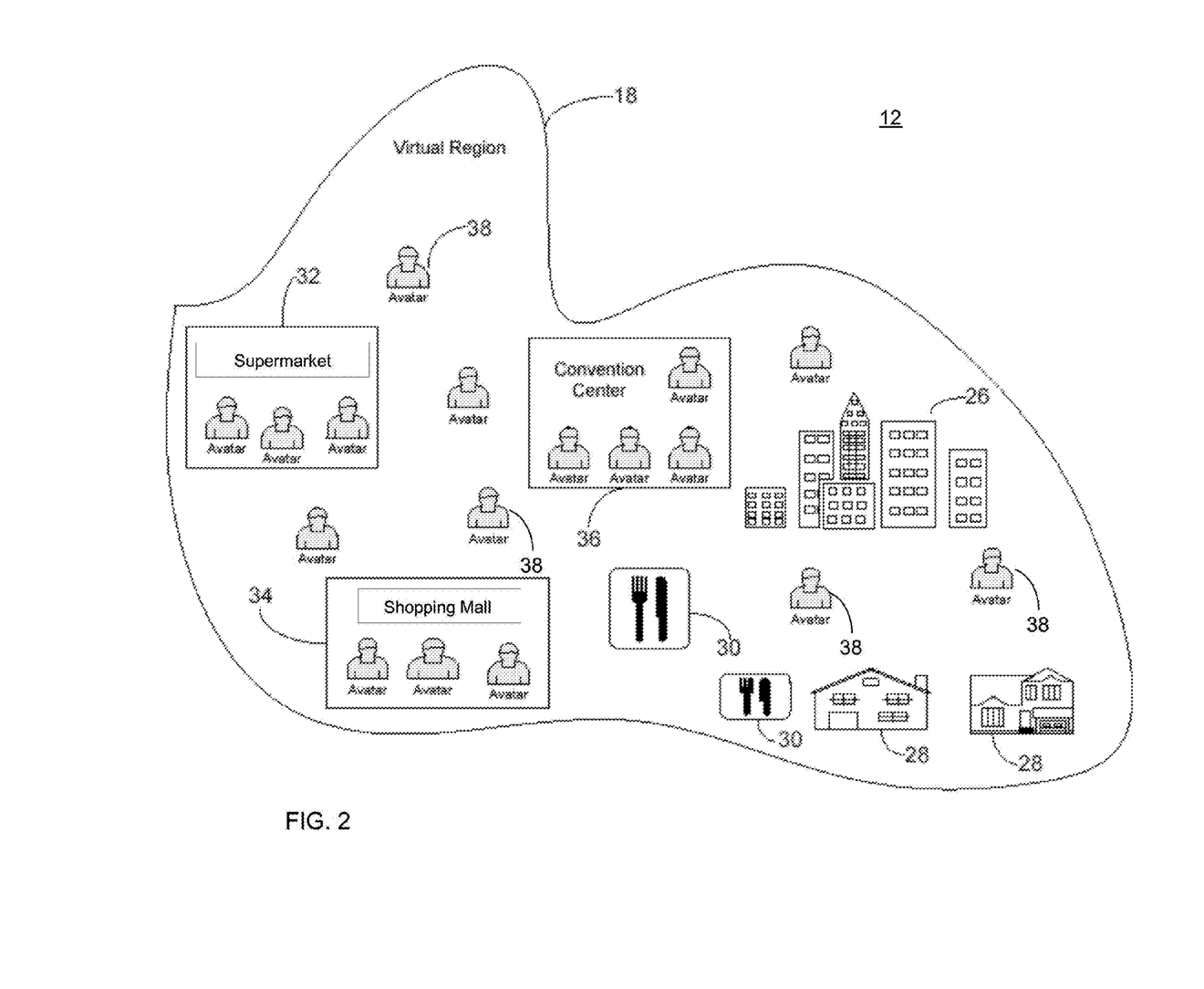
FIG. 2 shows a more detailed view of a virtual region shown in the virtual universe of FIG. 1.

FIG. 2 shows a more detailed view of what one virtual region 18 in VU 12 may comprise. As an example, virtual region 18 shown in FIG. 2 comprises a downtown office center 26, homes 28, restaurants 30, a supermarket 32 and a shopping mall 34 for shopping, and a convention center 36 for meetings and various conventions. Residents or avatars 38, which as mentioned above, are personas or representations of the users of the virtual universe, roam all about the virtual region by walking, driving, flying or even by teleportation or transportation, which is essentially moving through space from one point to another, more or less instantaneously. These examples of virtual content in virtual region 18 shown in FIG. 2 are only illustrative of some items that may be found in a virtual region and those skilled in the art will recognize that these regions can have more virtual content that can be found in the real world, as well as things that do not presently exist in the real world.

Figure 3:
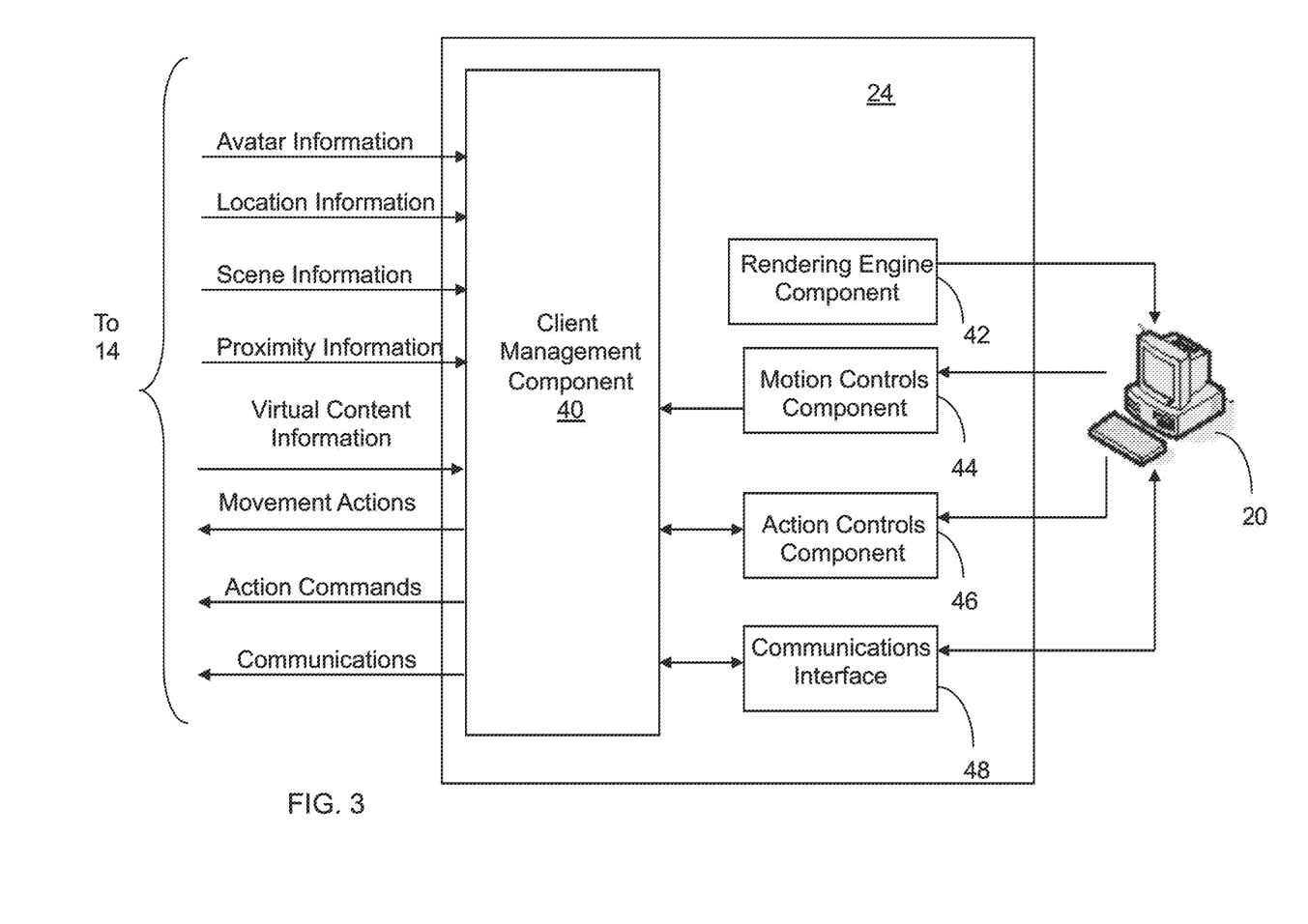
FIG. 3 shows a more detailed view of the virtual universe client shown in FIG. 1.

FIG. 3 shows a more detailed view of virtual universe client 24 shown in FIG. 1. Virtual universe client 24, which enables users to interact with VU 12, comprises a client management component 40, which manages actions, commands and communications made by a user through computer 20, and information received from the virtual universe through server array 14. A rendering engine component 42 enables the user of computer 20 to visualize his or her avatar within the surroundings of the particular region of VU 12 that the avatar is presently located. As will be further described herein, rendering engine 42 receives an alternative representation of virtual content in VU 12 and renders it for display to the user of computer 20.

A motion controls component 44 enables the user's avatar(s) to make movements through the virtual universe. In one embodiment, movements through the virtual universe can include, for example, gestures, postures, walking, running, driving, flying, etc. An action controls component 46 enables the user to perform actions in the virtual universe such as buying items for his or her avatar or even for their real-life selves, building homes, planting gardens, etc. These actions are only illustrative of some possible actions that a user can perform in the virtual universe and are not limiting. A communications interface 48 enables a user to communicate with other users of VU 12 through modalities such as chatting, instant messaging, gesturing, talking and electronic mail (email).

FIG. 3 shows the various types of information received by client management component 40 from the virtual universe through the server array 14. In particular, client management component 40 receives avatar information about the avatars that are in proximity to the user's avatar. In addition, client management component 40 receives location information about the area that the user's avatar is near (e.g., what region or land the avatar is in), as well as scene information (e.g., what the avatar sees). Client management component 40 also receives proximity information, which contains information on what the user's avatar is near, and virtual content information, which is information about the objects, texts, and scripts of the virtual content renderable in the virtual universe. FIG. 3 also shows the movement commands and action commands that are generated by the user and sent to the server array via client management component 40, as well as the communications that can be sent to the users of other avatars within the virtual universe.

Figure 4:
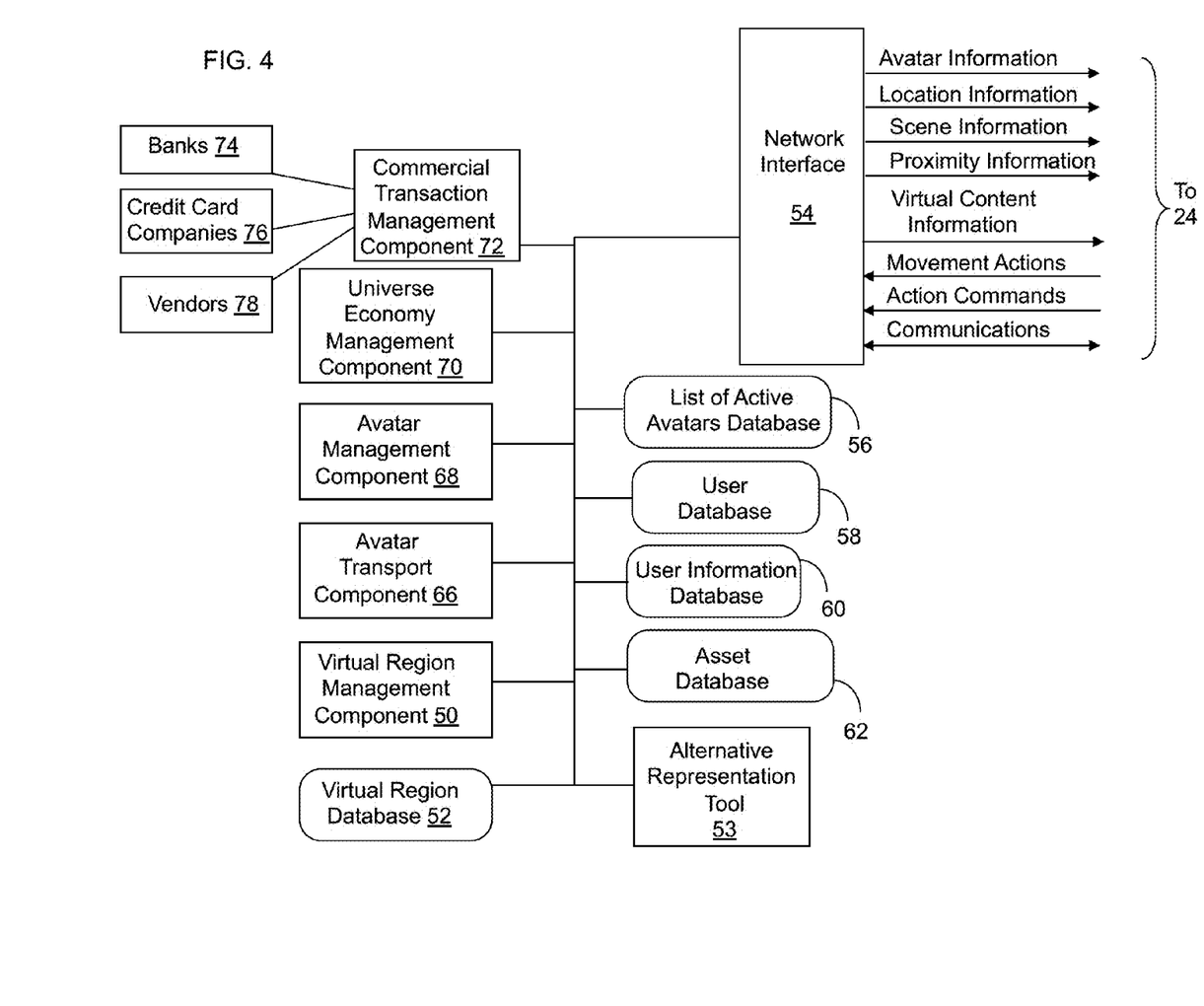
FIG. 4 shows a more detailed view of some of the functionalities provided by the server array shown in FIG. 1.

FIG. 4 shows a more detailed view of some of the functionalities provided by server array 14 shown in FIG. 1. In particular, FIG. 4 shows a virtual region management component 50 that manages a virtual region(s) within the virtual universe. Virtual region management component 50 manages what happens in a particular region, such as the type of landscape in that region, the number of homes, commercial zones, boutiques, streets, parks, restaurants, etc. Those skilled in the art will recognize that virtual region management component 50 can manage many other facets within the virtual region.

FIG. 4 shows a network interface 54 that enables server array 14 to interact with virtual universe client 24 residing on computer 20. In particular, network interface 54 communicates avatar, location, scene, proximity, and virtual content information to the user through virtual universe client 24. The network interface receives movement and action commands, as well as communications from the user via virtual universe client 24.

FIG. 4 also shows an alternative representation tool 53, which provides the capability to provide alternative representations of virtual content renderable in the virtual universe. An illustrative but non-limiting listing of types of alternative representations of virtual content renderable in the virtual universe includes a simplified geometric representation of at least a portion of the virtual content renderable in the virtual universe, an alternative color representation for at least a portion of the virtual content renderable in the virtual universe, or a modified visual lighting effect for at least a portion of the virtual content renderable in the virtual universe. In this embodiment, alternative representation tool 53 resides on the same computer system as virtual universe client 24. However, it can be appreciated that in other embodiments, alternative representation tool 53 may reside on servers 16, or reside on separate computers in direct communication with the virtual universe servers 16 and virtual universe clients 24.

As shown in FIG. 4, there are several different databases for storing information. In particular, virtual region database 52 stores information on all of the specifics in the virtual region that virtual region management component 50 is managing. Virtual region database 52 contains metadata information about the objects, texts and scripts associated with the virtual content in the virtual region(s) of VU 12. List of active avatars database 56 contains a list of all the avatars that are online in the VU 12, while databases 58 and 60 contain information on the actual human users of VU 12. In one embodiment, user database 58 contains general information on the users such as names, email addresses, locales, interests, ages, preferences, etc., while user information database 60 contains more sensitive information on the users such as billing information (e.g., credit card information) for taking part in transactions. In an exemplary embodiment, user database 58 contains information about the visual capacity of certain users. For example, user database 58 may contain information that classifies the user according to a level of visual impairment (e.g., relatively normal sighted, partially sighted, legally blind, totally blind, etc.).

Asset database 62 contains information on the avatars of the users that reside in VU 12. In one embodiment, asset database 62 contains information on the virtual content within the personal inventories of each avatar of the virtual universe. An illustrative but non-limiting listing of the virtual content that can be present in asset database 62 includes avatar accessories (e.g., clothing), virtual pets, vehicles, electronic media (e.g., music files), graphics files, sound files, animations, electronic documents, video files, avatar body parts, avatar tools, calling cards, note cards, photos and photo albums, or any other type of virtual content.

Those skilled in the art will also recognize that databases 56-62 may contain additional information if desired. Databases 56-62 may be consolidated into a single database or table, divided into multiple databases or tables, or clustered into a database system spanning multiple physical and logical devices. Further, although the above information is shown in FIG. 4 as being stored in databases, those skilled in the art will recognize that other configurations and means of storing information can be utilized. For example, databases 56-62 might reside on the same computers as virtual universe client 24, have components that reside on both server array 14 and virtual universe client 24, or reside on separate computers in direct communication with virtual universe servers 16 and virtual universe client 24.

An avatar transport component 66 enables users to transport, which as mentioned above, allows avatars to transport through space from one point to another point, instantaneously. As a result, an avatar could for example travel from a business region to an entertainment region to experience a concert.

An avatar management component 68 keeps track of what the avatars are doing while in the virtual universe. For example, avatar management component 68 can track where each avatar is presently located in the virtual universe, as well as what activities it is performing or has recently performed. An illustrative but non-exhaustive list of activities can include shopping, eating, talking, recreating, etc.

Because a typical virtual universe has a vibrant economy, server array 14 has functionalities that are configured to manage the economy. In particular, a universe economy management component 70 manages transactions that occur within the virtual universe between avatars. In one embodiment, VU 12 will have its own VU currency ($VU) that users pay for with real-life money. The users can then take part in commercial transactions for their avatars through universe economy management component 70. For example, an avatar might want to pay for a service that provides discovery and transfer of assets within the virtual universe. In this case, the avatar would make the purchase of this service using the $VU. In some instances, the user may want to take part in a commercial transaction that benefits him or her and not an avatar. In this case, a commercial transaction management component 72 allows the user to participate in the transaction. For example, while walking around a commercial zone, a user may see a pair of shoes that he or she would like for themselves and not an avatar. In order to fulfill this type of transaction and others similarly related, commercial transaction management component 72 interacts with banks 74, credit card companies 76 and vendors 78.

Figure 5:
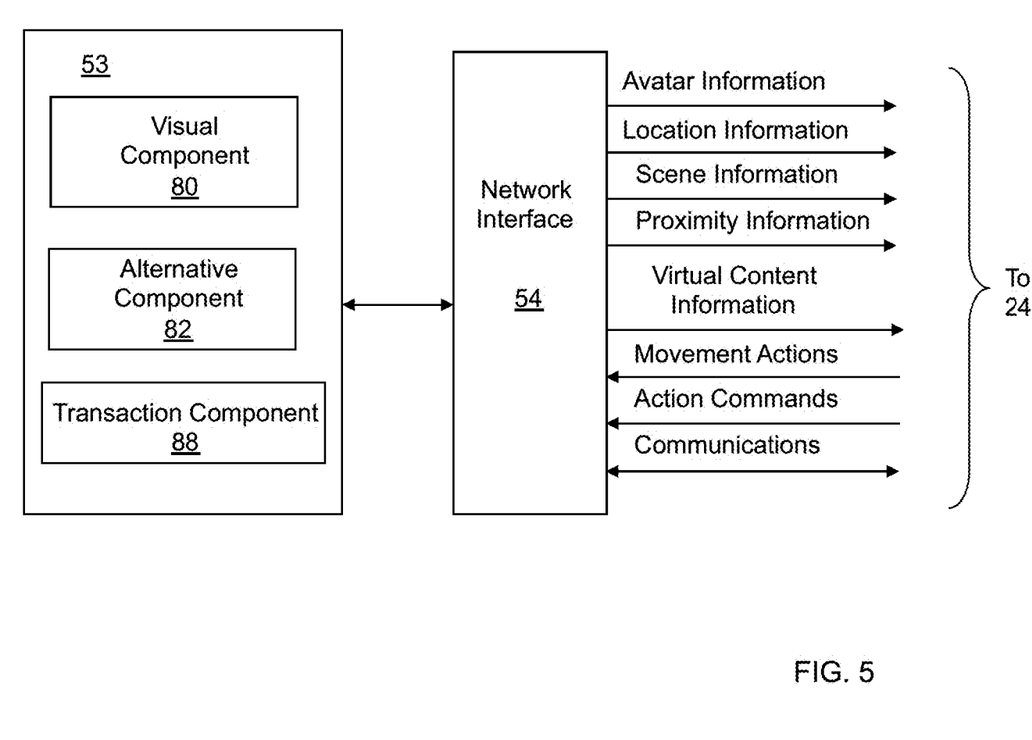
FIG. 5 shows an alternative representation tool according to one embodiment of this invention that operates in the environment shown in FIG. 1.

Referring now to FIG. 5, alternative representation tool 53 according to embodiments of the invention will be described in further detail. As shown in FIG. 5, alternative representation tool 53 comprises a visual component 80 configured to determine a visual capacity of a user of VU 12. The users of VU 12 may have widely varying visual capacity levels influenced by factors such as loss of vision, or simply the inability to comfortably view and process complex and/or subtle virtual content. Users of VU 12 may have varying levels of visual impairment ranging from relatively no visual impairment (e.g., 20/20 vision or better), to severe visual impairment (e.g., 20/200 vision or worse, with correction). This visual capacity information may be stored in the user's profile, such as within user database 58 (FIG. 4), and accessed by visual component 80 when the user logs into VU 12 or enters a region within VU 12. Visual component 80 communicates with user database 58 to determine the visual capacity of the user to view, interpret, and interact with the virtual content renderable in the region of the virtual universe that the user's avatar is currently located.

In another embodiment, the user can indicate his/her visual capacity by selecting a desired type or level of alternative representation. For example, the user may be presented with a sampling of alternative representations from which to choose from. The user selects the desired type or level of alternative representation based on the user's comfort level for viewing and interacting with the virtual content. The selection(s) are then stored in the user's profile in user database 58 and accessed each time the user logs into the virtual universe or enters a particular region.

As shown in FIG. 5, alternative representation tool 53 further comprises an alternative component 82 configured to provide an alternative representation of the virtual content renderable in the virtual universe based on the visual capacity of the user of the virtual universe. An illustrative but non-limiting listing of types of alternative representations possible within the virtual universe includes simplified geometric representations of objects (e.g., basic geometric shapes or simplified representations of avatars using stick-figures), high-contrast colorations for adjacent objects, or decreased visual lighting effects (e.g., shadows or complex shading).

In one embodiment, to provide an alternative representation, alternative component 82 is configured to modify the definition of the virtual content renderable in the virtual universe. As discussed above, the virtual content of VU 12 is defined in terms of a virtual reality modeling language, wherein the definition of the virtual content comprises programming data necessary for executing the objects, texts, and scripts within virtual universe 12. In one embodiment, alternative component 82 is configured to annotate the definition of the virtual content renderable in the virtual universe with metadata that identifies how to modify the virtual content renderable in the virtual universe. For example, when authoring the world, metadata is added to the definition that explicitly states how an object, or class of objects is to be displayed to the user.

Figure 6:
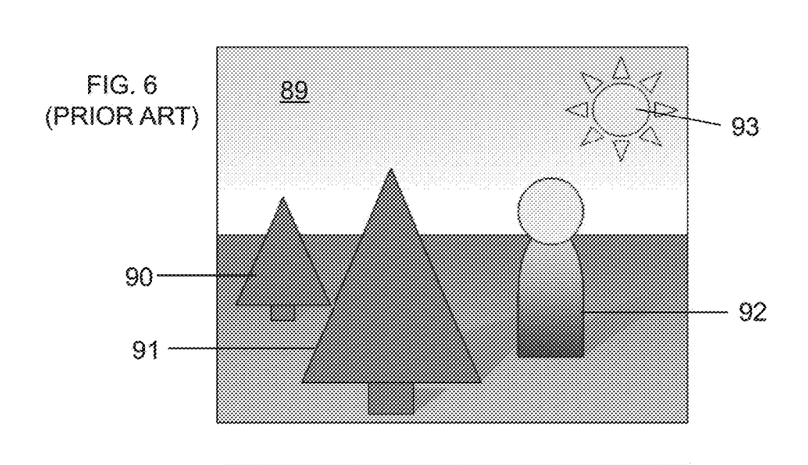
FIG. 6 shows a more detailed view of virtual content rendered in a prior art virtual universe.

Consider, for example, the virtual content rendered in a prior art virtual universe 89 depicted in FIG. 6. Each of objects 90, 91, 92 may be associated with one or more scripts that affect rendering in some fashion during a session in the virtual universe. In this example, objects 90, 91, 92 are rendered with scripts corresponding to visual lighting effects, such as the shadowing caused by the presence of a virtual sun 93. Object 92 (i.e., an avatar) is shown with a gradually shaded "torso," also resulting from virtual sun 93. Depending on the visual capacity of a user, the visual lighting effects present in FIG. 6 can make it difficult for vision impaired users, as well as non-vision impaired users, to identify and distinguish objects in prior virtual universe 89.

Figure 7:
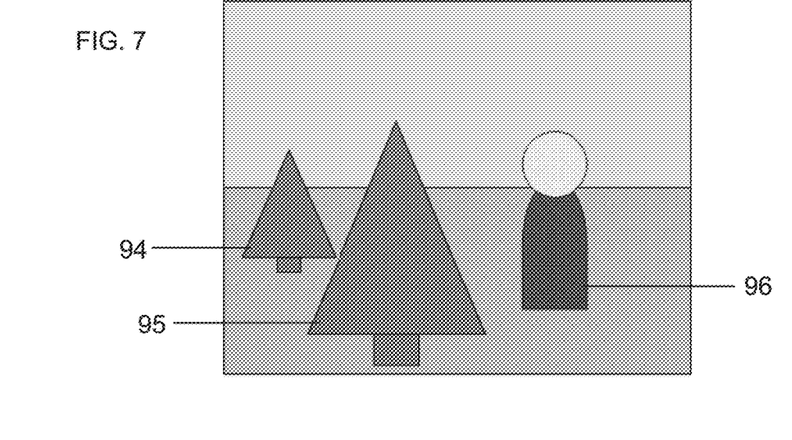
FIG. 7 shows a more detailed view of an exemplary alternative representation of the virtual content shown in FIG. 6.

As shown in FIG. 7, alternative component 82 of the present invention modifies the definition of the virtual content rendered in the virtual universe. Specifically, alternative component 82 annotates the definition of the script(s) associated with the virtual content with metadata that identifies how to eliminate the visual lighting effects from objects 94, 95, and 96, such as the shadowing present in FIG. 6. The modified definition is sent to rendering engine 42 (FIG. 3) and rendered to the user of the virtual universe as depicted in FIG. 7. This simplified virtual content rendered without visual lighting effects allows users to more easily view and distinguish between objects 94, 95, and 96 in the virtual universe.

Figure 8:
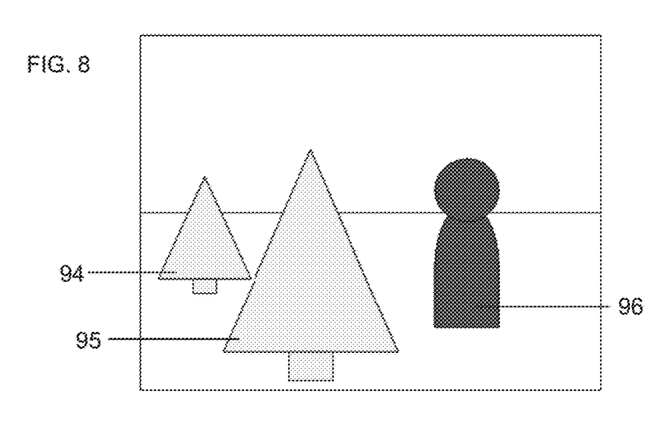
FIG. 8 shows a more detailed view of an exemplary alternative representation of the virtual content shown in FIGS. 6-7.

In another embodiment, as shown in FIG. 8, alternative component 82 of the present invention may modify the colors and/or shading of the objects in the virtual universe. Specifically, alternative component 82 annotates the definition of the script(s) associated with the virtual content with metadata that identifies how to modify the color of objects 94, 95, 96. Alternative component 82 may change the color/shading of one or more of objects 94, 95, 96 to increase the relative contrast between the objects. Each adjacent object may be shaded differently to emphasize the boundaries of each adjacent object, or, as shown in FIG. 8, each object type may be assigned a different color to further distinguish between types or classes of objects in the virtual universe (colors not depicted). For example, both of objects 94 and 95 (i.e., virtual trees) may be rendered a light green color, while object 96 (i.e., an avatar) is rendered in dark blue.

Figure 9:
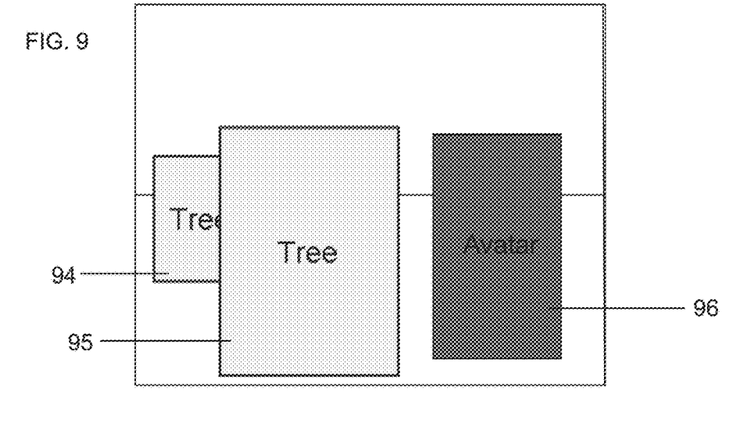
FIG. 9 shows a more detailed view of an exemplary alternative representation of the virtual content shown in FIGS. 6-8.

In the embodiment shown in FIG. 9, alternative component 82 of the present invention may also modify the shape of the objects in the virtual universe. Specifically, alternative component 82 annotates the definition of the objects associated with the virtual content with metadata that identifies how to provide simplified geometric representations of objects 94, 95, and 96. Alternative component 82 may change the shape of one or more of objects 94, 95, 96 to decrease the complexity of each object and increase the ease of identification of each object. For example, objects 94 and 95 (i.e., virtual trees) may each be rendered as a single rectangle, instead of as a combined triangle and rectangle, as shown in FIG. 8. Further, each object optionally has a text label (e.g., "Tree" or "Avatar") that may be taken from the definition of the virtual content.

It can be appreciated that virtual universes may initially contain a large number of decorate visual objects that are provided for aesthetic purposes only. Alternative component 82 of the present invention recognizes these objects as non-essential or non-interactive objects that should be decreased or eliminated to clarify the essential virtual content. For example, if a virtual tree has non-interactive apples growing on it, alternative component 82 eliminates the apples in the simplified alternative representation of the virtual content.

FIG. 9 demonstrates that the annotated definitions of virtual content in the alternative representations shown in each of FIGS. 7-9 may be aggregated and rendered together. However, it can also be appreciated that the various alternative representations of virtual content shown in FIGS. 7-9 represent potential approaches and degrees of simplifying that may be rendered singly or in combination depending on the desired effect, and are not intended to limit the scope of the invention.

In another embodiment, the alternative representations described herein and shown in FIGS. 7-9 can be generated and rendered automatically. Specifically, alternative component 82 is configured to compare the virtual content renderable in the virtual universe to a set of rendering rules to automatically provide an alternative representation of the virtual content renderable in the virtual universe. For example, one rendering rule may state that all objects having non-interactive scripts associated with them are non-essential and therefore are to be rendered in a particular way. A virtual tree, for example, may have non-interactive apples growing on it. According to one possible rendering rule, an alternative representation of the non-interactive apples may comprise partially transparent, dull renderings of the apples on the virtual tree.

As described herein, the present invention allows for alternative representations of virtual content in a virtual universe, such that virtual universes are easier to view and navigate for the visually impaired and the non-visually impaired. The present invention provides an alternative representation tool configured to determine a visual capacity of a user of a virtual universe and to provide an alternative representation of the virtual content based on the visual capacity of the user. The present invention achieves an inclusive approach to virtual universes, especially for business organizations or government agencies in which accessibility compliance for all users is important and/or required.

In another embodiment of this invention, alternative representation tool 53 is used as a service to charge fees for providing alternative representations of virtual content in the virtual world. As shown in FIG. 5, alternative representation tool 53 comprises a transaction component 88 configured to charge a transaction fee for facilitating the providing of the alternative representation of virtual content renderable in the virtual universe. In this embodiment, the provider of the virtual universe or a third party service provider could offer this transaction as a service by performing the functionalities described herein on a subscription and/or fee basis. In this case, the provider of the virtual universe or the third party service provider can create, deploy, maintain, support, etc., alternative representation tool 53 that performs the processes described in the invention. In return, the virtual universe or the third party service provider can receive payment from the virtual universe residents via universe economy management component 70 and commercial transaction management component 72 (FIG. 4).

In still another embodiment, the methodologies disclosed herein can be used within a computer system to provide alternative representations of virtual content in the virtual world. In this case, alternative representation tool 53 can be provided, and one or more systems for performing the processes described in the invention can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 10:
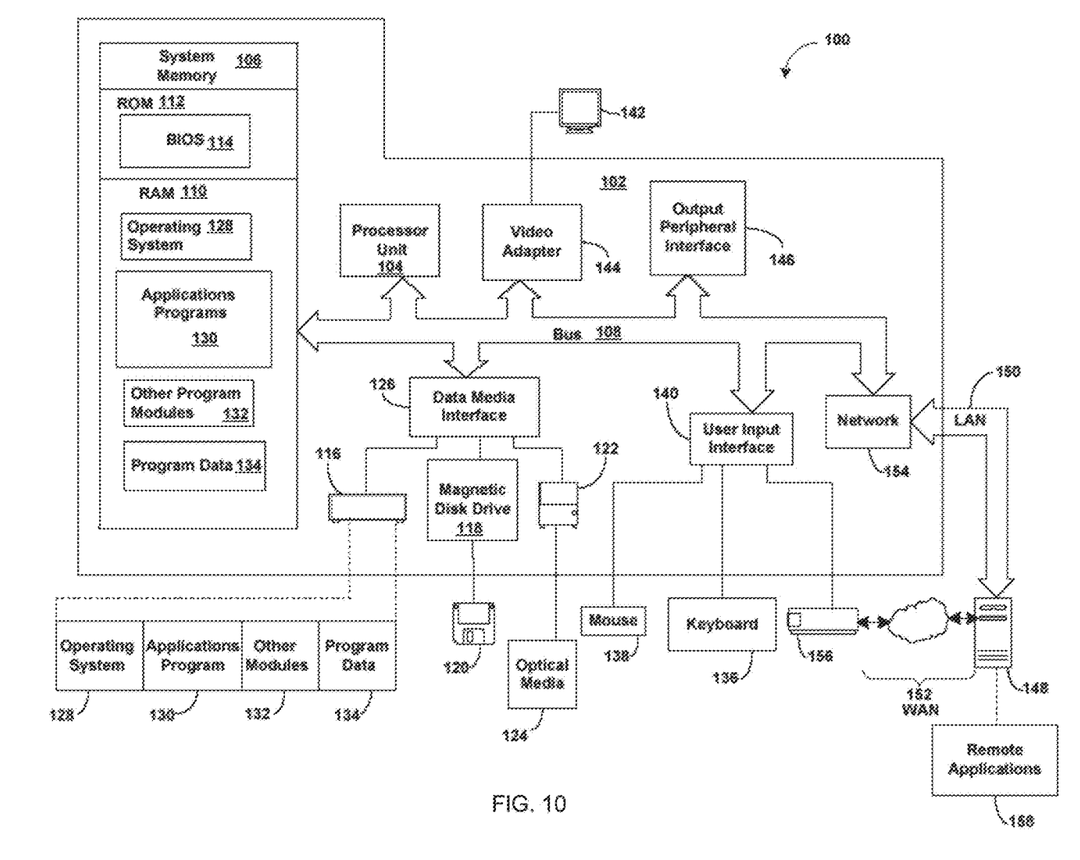
FIG. 10 shows a schematic of an exemplary computing environment in which elements of the networking environment shown in FIG. 1 may operate.

FIG. 10 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the approach described herein. Neither should computing environment 100 be interpreted as having any dependency or requirement relating to any one or combination of components illustrated in FIG. 10.

In the computing environment 100 there is a computer 102, which is operational with numerous other general purpose or special purpose computing system environments or configurations. Examples of well known computing systems, environments, and/or configurations that may be suitable for use with computer 102 of the present invention include, but are not limited to, personal computers, server computers, thin clients, thick clients, hand-held or laptop devices, cellular telephones, personal digital assistants (PDA), multiprocessor systems, microprocessor-based systems, set top boxes, programmable consumer electronics, network PCs, minicomputers, mainframe computers, distributed computing environments that include any of the above systems or devices, and the like.

Computer 102 may be described in the general context of computer-executable instructions, such as program modules, being executed by a computer. Generally, program modules include routines, programs, objects, components, logic, data structures, and so on that perform particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 10, computer 102 in the computing environment 100 is shown in the form of a general-purpose computing device. The components of computer 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer 102 typically includes a variety of computer readable media. Such media may be any available media that is accessible by computer 102, and it includes both volatile and non-volatile media, removable and non-removable media.

In FIG. 10, system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 10 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. Hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on hard disk 116, magnetic disk 120, optical disk 122, ROM 112, or RAM 110, including, by way of example, and not limitation, an operating system 128, one or more application programs 130, other program modules 132, and program data 134. Each of the operating system 128, one or more application programs 130 other program modules 132, and program data 134 or some combination thereof, may include an implementation of the networking environment 10 of FIG. 1 including server array 14 and virtual universe client 24. In one embodiment, the one or more application programs 130 include components of alternative representation tool 53, such as visual component 80, alternative component 82, and transaction component 88.

Figure 11:
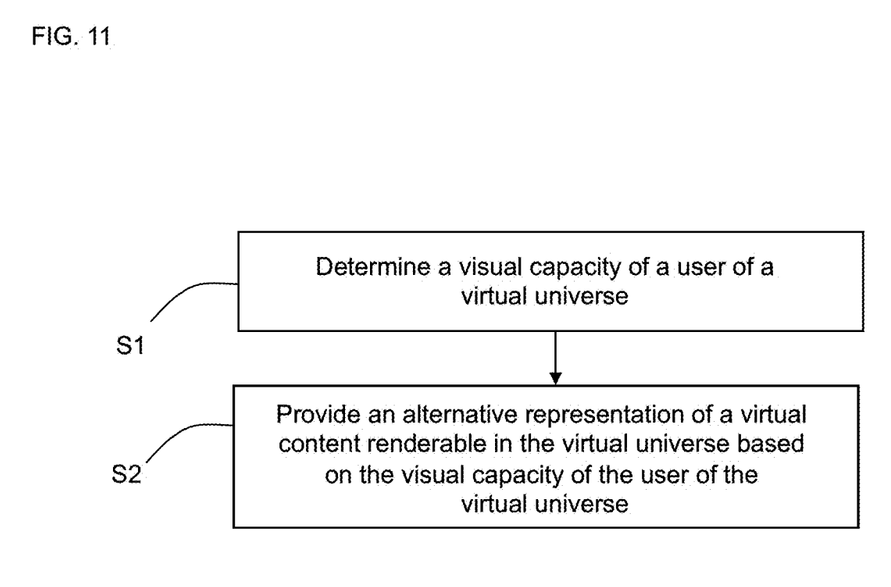
FIG. 11 shows a flow diagram of a method for providing an alternative representation of virtual content in a virtual universe according to embodiments of the invention.

The one or more program modules 130 carry out the methodologies disclosed herein, as shown in FIG. 11. According to one embodiment, in step S1, a visual capacity of a user of a virtual universe is determined. In S2, an alternative representation of a virtual content renderable in the virtual universe is provided to the user of the virtual universe based on the visual capacity of the user. The flowchart of FIG. 11 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Referring back to FIG. 10, a user may enter commands and information into computer 102 through optional input devices such as a keyboard 136 and a pointing device 138 (e.g., a "mouse"). Other input devices (not shown) may include a microphone, joystick, game pad, satellite dish, serial port, scanner, camera, or the like. These and other input devices are connected to processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 10 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to system bus 108 via the user input interface 140 or other appropriate mechanism.

In a networked environment, program modules depicted relative to the personal computer 102, or portions thereof, may be stored in a remote memory storage device. By way of example, and not limitation, FIG. 10 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for providing an alternative representation of virtual content in a virtual universe. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for providing an alternative representation of virtual content in a virtual universe, comprising the computer implemented steps of:

displaying a set of virtual universe alternative representations to a user of a virtual universe, the virtual universe including a computer-based virtual environment that a plurality of users access and interact with using avatars;

receiving input from the user corresponding to a set of desired virtual universe alternative representation characteristics;

defining a set of virtual content of the virtual universe in terms of a virtual reality modeling language, wherein the virtual content definitions comprise programming data necessary for executing objects, texts, and scripts within the virtual universe;

accessing, in response to the user entering a region of the virtual universe, visual capacity information stored in a user profile associated with the user within a user database;

determining a visual capacity of a user of the virtual universe based on the input from the user and the visual capacity information;

providing, by a server array, an alternative representation of a virtual content of the virtual universe renderable to the user by modifying the definition of the virtual content renderable in the virtual universe with metadata that identifies how to modify the virtual content renderable in the virtual universe based on the visual capacity of the user of the virtual universe,—wherein the modifying further includes:

annotating the definition of the scripts associated with the virtual content with metadata that identifies how to eliminate visual lighting effects from objects;

annotating the definition of the scripts associated with the virtual content with metadata that identifies how to modify the color of objects; and annotating the definition of the objects associated with the virtual content with metadata that identifies how to provide simplified geometric representations of the objects.

2. The method according to claim 1, the computer implemented step of providing comprising modifying a definition of the virtual content renderable in the virtual universe.

3. The method according to claim 1, the providing comprising comparing the virtual content renderable in the virtual universe to a set of rendering rules to automatically provide an alternative representation of the virtual content renderable in the virtual universe.

4. The method according to claim 2, the modifying comprising annotating the definition of the virtual content renderable in the virtual universe with metadata that identifies how to modify the virtual content renderable in the virtual universe, and the definition of the virtual content renderable in the virtual universe comprising programming data associated with a plurality of objects each comprising a set of texts and a set of scripts.

5. The method according to claim 1, further comprising the computer-implemented steps of:

determining a second visual capacity of a second user of the virtual universe based on the input and the visual capacity information from the second user; and providing, by the server array, a second alternative representation of the virtual content of the virtual universe renderable to the second user by modifying the definition of the virtual content renderable in the virtual universe with metadata that identifies how to modify the virtual content renderable in the virtual universe based on the visual capacity of the second user, wherein an image in the second alternative representation of the virtual universe viewed by the second user is altered to appear different to the second user than the image in the virtual universe viewed than an identical viewpoint by the user appears to the user according to the alternative representation.

6. The method according to claim 1, the alternative representation of the virtual content renderable in the virtual universe comprising at least one of the following: a simplified geometric representation of at least a portion of the virtual content renderable in the virtual universe, an alternative color representation for at least a portion of the virtual content renderable in the virtual universe, or a modified visual lighting effect for at least a portion of the virtual content renderable in the virtual universe.

7. A computer system for providing an alternative representation of virtual content in a virtual universe, comprising:

at least one processing unit;

memory operably associated with the at least one processing unit; and an alternative representation tool storable in memory and executable by the at least one processing unit, the alternative representation tool performing a method, comprising:

displaying a set of virtual universe alternative representations to a user of a virtual universe, the virtual universe including a computer-based virtual environment that a plurality of users access and interact with using avatars;

receiving input from the user corresponding to a set of desired virtual universe alternative representation characteristics;

defining a set of virtual content of the virtual universe in terms of a virtual reality modeling language, wherein the virtual content definitions comprise programming data necessary for executing objects, texts, and scripts within the virtual universe;

accessing, in response to the user entering a region of the virtual universe, visual capacity information stored in a user profile associated with the user within a user database;

determining a visual capacity of a user of the virtual universe based on the input from the user and the visual capacity information;

providing, by a server array, an alternative representation of a virtual content of the virtual universe renderable to the user by modifying the definition of the virtual content renderable in the virtual universe with metadata that identifies how to modify the virtual content renderable in the virtual universe based on the visual capacity of the user of the virtual universe,—wherein the modifying further includes:

annotating the definition of the scripts associated with the virtual content with metadata that identifies how to eliminate visual lighting effects from objects;

annotating the definition of the scripts associated with the virtual content with metadata that identifies how to modify the color of objects; and annotating the definition of the objects associated with the virtual content with metadata that identifies how to provide simplified geometric representations of the objects.

8. The alternative representation tool according to claim 7, the method further comprising modifying a definition of the virtual content renderable in the virtual universe.

9. The alternative representation tool according to claim 7, the method further comprising comparing the virtual content rendered in the virtual content to a set of rendering rules to automatically provide an alternative representation of the virtual content renderable in the virtual universe.

10. The alternative representation tool according to claim 8, the method further comprising annotating the definition of the virtual content renderable in the virtual universe with metadata that identifies how to modify the virtual content renderable in the virtual universe, the definition of the virtual content renderable in the virtual universe comprising programming data associated with a plurality of objects each comprising a set of texts and a set of scripts.

11. The alternative representation tool according to claim 10, the method further comprising:

determining a second visual capacity of a second user of the virtual universe based on the input and the visual capacity information from the second user; and providing, by the server array, a second alternative representation of the virtual content of the virtual universe renderable to the second user by modifying the definition of the virtual content renderable in the virtual universe with metadata that identifies how to modify the virtual content renderable in the virtual universe based on the visual capacity of the second user, wherein an image in the second alternative representation of the virtual universe viewed by the second user is altered to appear different to the second user than the image in the virtual universe viewed than an identical viewpoint by the user appears to the user according to the alternative representation.

12. The alternative representation tool according to claim 7, the alternative representation of the virtual content renderable in the virtual universe comprising at least one of the following: a simplified geometric representation of at least a portion of the virtual content renderable in the virtual universe, an alternative color representation for at least a portion of the virtual content renderable in the virtual universe, or a modified visual lighting effect for at least a portion of the virtual content renderable in the virtual universe.

13. A computer-readable storage device storing computer instructions, which when executed, enables a computer system to provide an alternative representation of virtual content in a virtual universe, the computer instructions comprising:

displaying a set of virtual universe alternative representations to a user of a virtual universe, the virtual universe including a computer-based virtual environment that a plurality of users access and interact with using avatars;

receiving input from the user corresponding to a set of desired virtual universe alternative representation characteristics;

defining a set of virtual content of the virtual universe in terms of a virtual reality modeling language, wherein the virtual content definitions comprise programming data necessary for executing objects, texts, and scripts within the virtual universe;

accessing, in response to the user entering a region of the virtual universe, visual capacity information stored in a user profile associated with the user within a user database;

determining a visual capacity of a user of the virtual universe based on the input from the user and the visual capacity information;

providing, by a server array, an alternative representation of a virtual content of the virtual universe renderable to the user by modifying the definition of the virtual content renderable in the virtual universe with metadata that identifies how to modify the virtual content renderable in the virtual universe based on the visual capacity of the user of the virtual universe,—wherein the modifying further includes:

annotating the definition of the scripts associated with the virtual content with metadata that identifies how to eliminate visual lighting effects from objects;

annotating the definition of the scripts associated with the virtual content with metadata that identifies how to modify the color of objects; and annotating the definition of the objects associated with the virtual content with metadata that identifies how to provide simplified geometric representations of the objects.

14. The computer-readable storage device according to claim 13, the providing comprising instructions for modifying a definition of the virtual content renderable in the virtual universe.

15. The computer-readable storage device according to claim 13, the providing comprising instructions for comparing the virtual content renderable in the virtual universe to a set of rendering rules to automatically provide an alternative representation of the virtual content renderable in the virtual universe.

16. The computer-readable storage device according to claim 14, the instructions for modifying a definition of the virtual content renderable in the virtual universe further comprising instructions for annotating the definition of the virtual content renderable in the virtual universe with metadata that identifies how to modify the virtual content renderable in the virtual universe, and the definition of the virtual content renderable in the virtual universe comprising programming data associated with a plurality of objects each comprising a set of texts and a set of scripts.

17. The computer readable storage device according to claim 16, the computer instructions further comprising:

determining a second visual capacity of a second user of the virtual universe based on the input and the visual capacity information from the second user; and providing, by the server array, a second alternative representation of the virtual content of the virtual universe renderable to the second user by modifying the definition of the virtual content renderable in the virtual universe with metadata that identifies how to modify the virtual content renderable in the virtual universe based on the visual capacity of the second user, wherein an image in the second alternative representation of the virtual universe viewed by the second user is altered to appear different to the second user than the image in the virtual universe viewed than an identical viewpoint by the user appears to the user according to the alternative representation.

18. The computer readable storage device according to claim 13, the alternative representation of the virtual content renderable in the virtual universe comprising at least one of the following: a simplified geometric representation of at least a portion of the virtual content renderable in the virtual universe, an alternative color representation for at least a portion of the virtual content renderable in the virtual universe, or a modified visual lighting effect for at least a portion of the virtual content renderable in the virtual universe.

* * * * *